United States Patent [19]

Levinson

[11] 4,235,360

[45] Nov. 25, 1980

[54] BI-DIRECTIONAL PIN FEED APPARATUS

[75] Inventor: Leo Levinson, Berkeley, Calif.

[73] Assignee: Xerox Corporation, Stamford, Conn.

[21] Appl. No.: 929,478

[22] Filed: Jul. 31, 1978

[51] Int. Cl.³ .......... G03B 1/24

[52] U.S. Cl. .......... 226/76; 226/87

[58] Field of Search .......... 226/81, 87, 76, 78, 226/75

[56] References Cited

U.S. PATENT DOCUMENTS

| | | | |
|---|---|---|---|
| 2,432,967 | 12/1947 | Johnson | 226/81 X |
| 2,779,451 | 1/1957 | Becker | 400/639.2 |
| 3,157,266 | 11/1964 | Dollenmayer | 400/636.1 |
| 3,915,276 | 10/1975 | Metz | 400/124 |
| 3,915,281 | 10/1975 | Blomquist et al. | 400/569 |
| 3,917,048 | 11/1975 | Riley | 400/616.1 |
| 3,954,163 | 5/1976 | Gabor | 400/144.2 |
| 4,022,365 | 5/1977 | Weller | 226/81 |
| 4,031,995 | 6/1977 | Blum et al. | 400/636.1 |
| 4,033,493 | 7/1977 | Levinson | 226/81 |
| 4,046,245 | 9/1977 | Frechette | 400/354 |
| 4,053,043 | 10/1977 | Deetz | 400/144.2 |
| 4,060,162 | 11/1977 | Frechette | 400/144.2 |
| 4,076,160 | 2/1978 | Azzalin et al. | 226/82 |

FOREIGN PATENT DOCUMENTS

| | | |
|---|---|---|
| 570693 | 7/1945 | United Kingdom . |
| 741459 | 12/1955 | United Kingdom . |
| 834616 | 5/1960 | United Kingdom . |
| 918981 | 2/1963 | United Kingdom . |
| 944358 | 12/1963 | United Kingdom . |
| 1148559 | 4/1969 | United Kingdom . |

*Primary Examiner*—Leonard D. Christian
*Attorney, Agent, or Firm*—Barry Paul Smith

[57] ABSTRACT

A pin feed apparatus is provided for a printing machine of the type including a main frame and a printing station. The pin feed apparatus is capable of feeding marginally punched record material past the printing station and includes a shaft rotatably mounted to the main frame, a platen mounted about the shaft for rotation therewith, and a pin wheel feeding device for feeding marginally punched record material disposed about the platen past the printing station. The pin wheel feeding device includes a housing coupled to the shaft adjacent an end of the platen for rotation therewith. The housing has a plurality of openings formed therein and the pin wheel feeding device further includes a cam member fixed in position relative to the housing and a plurality of pins disposed within the housing in respective alignment with the plurality of openings. The pins cooperate with the cam member during rotation of the housing to project from their respective openings for a predetermined segment of their path of circumferential movement. The pin feed apparatus further includes guide means connected to the frame and including a pair of guide members positioned on either side of the path of circumferential movement of the pins. The guide members are located adjacent the predetermined segment to define a gap between each guide member and the housing through which record material is advanced during rotation of the shaft.

9 Claims, 4 Drawing Figures

BI-DIRECTIONAL PIN FEED APPARATUS

BACKGROUND OF THE INVENTION

This invention relates to apparatus capable of feeding marginally punched record material and, more particularly, to a bi-directional pin feed apparatus for use with a printing machine of the type comprising a main frame and a printing station past which record material is fed.

When feeding marginally punched record material, such as computer forms paper, it is generally necessary to use a feeding apparatus different than the conventional platen-lower pressure roller arrangement, due to the thickness of the multicopy paper variety and the use of periodic perforations for tearing purposes. The two most common feeding apparatus for this type of record material are the pin feed apparatus and the tractor feed apparatus. An exemplary pin feed apparatus is disclosed in U.S. Pat. No. 4,033,493, whereas an exemplary tractor feed apparatus is disclosed in U.S. Pat. No. 4,042,091.

Recently, it has become necessary to provide a record material feed apparatus with a bi-directional feeding capability. This is especially true when computer forms paper is used to print graphical data and the like. A pin feed apparatus having a bi-directional feeding capability is disclosed in the above-referenced U.S. Pat. No. 4,033,493, whereas a bidirectional record material feed apparatus employing both pin feed and tractor drive mechanisms is disclosed in copending U.S. Application Ser. No. 917,233 filed in the names of Leo Levinson and William Rempel on June 20, 1978 for BIDIRECTIONAL RECORD MATERIAL FEED APPARATUS and assigned to the assignee of the present invention.

One problem with bi-directional pin feed apparatus in general has to do with the ease of loading the record material, as well as the ease with which such record material may be torn along a perforation above the writing line of the record material remaining in the printer without impediment due to the upper projecting pins or without requiring repositioning or reloading of record material. In this respect, and as shown in U.S. Pat. No. 4,033,493, it is normally the case in bi-directional pin feed apparatus for the pins of the pin wheel feeding devices to project from two segments of their path of circumferential movement, i.e., generally upwardly to primarily control positive forward feeding of the record material, and generally downwardly to primarily control reverse feeding.

I have recognized that the record material could be more easily loaded onto the pin wheel feeding devices and about the platen, as well as more easily torn along its perforations very close to the upper writing line of the record material remaining in the printer by eliminating the upper projecting pins. However, in order to maintain reversibility, this would require redesigning the segment along which the lower pins project. More specifically, and as shown in U.S. Pat. No. 4,033,493, the lower pins generally project along a segment which extends quite a bit upwardly in the front of the platen. If these pins were left positioned as is and the upper pins that are normally used for forward feeding were eliminated, problems would arise during forward feeding such as buckling of the record material or having the record material disengage from the feed apparatus. In order to avoid these problems, I have discovered that the lower pins should be shifted in position to project more straight downwardly in order positively feed record material in both directions from the curved area of the record material as engaged about the lower area of the platen.

One problem with so repositioning the lower pins has to do with the present mechanical arrangement at the lower area of the platen. Such arrangement includes the lower bail-bar, pressure roller assembly and the conventional paper guide pan. The presence and location of these components makes repositioning of the lower pins to the desired location above described virtually impossible.

It would be desirable, therefore, to provide a bi-directional pin feed apparatus free of upper projecting pins thereby enabling the easy tearing of record material segments just above the writing line of the record material remaining in the printer, wherein the lower pins project along a desired curved area of the record material's engagement about the platen. It would further be desirable if such pin feed apparatus was capable of easily loading the record material thereon and into the printer about the platen.

SUMMARY OF THE INVENTION

In accordance with the present invention, a pin feed apparatus is provided for a printing machine of the type including a main frame and a printing station. The pin feed apparatus is capable of feeding marginally punched record material past said printing station and comprises a shaft rotatably mounted to said main frame; a platen mounted about said shaft for rotation therewith; a pin wheel feeding device for feeding marginally punched record material disposed about said platen past said printing station, said pin wheel feeding device including a housing coupled to said shaft adjacent an end of said platen for rotation therewith, said housing having a plurality of openings formed therein, said pin wheel feeding device further including a cam member fixed in position relative to said housing and a plurality of pins disposed within said housing in respective alignment with said plurality of openings, said pins cooperating with said cam member during rotation of said housing to project from their respective openings for a predetermined segment of their path of circumferential movement; and guide means connected to said frame and including a pair of guide members positioned on either side of the path of circumferential movement of said pins, said guide members being located adjacent said predetermined segment to define a gap between each guide member and said housing through which record material is advanced during rotation of said shaft.

By having the pair of guide members positioned adjacent the segment along which the pins project, but on either side of the path of movement of the pins, there is no interference with these pins at all, as would be the case with the conventional lower bail-bar roller arrangement. Further, the guide members accurately define a desired gap through which the record material is to be fed without the need of having a separate guide pan. Accordingly, both the lower bail bar rollers and guide pan are eliminated.

In accordance with the preferred embodiment, a plurality of guide members are slidably mounted along a bar that allows a gap between the guide member and the platen slightly more than the thickness of the record material. This contributes to a feeding capability of record material having as many as 10 or more multicopy forms. The bar is preferably rotatable about its axis in order for the assembly comprised of the bar and guide members to be swivelable. In this manner, the gap size can be self-adjusting from front to back in order to allow creases of the form to pass through without interruption.

In accordance with another feature of the preferred embodiment, the segment of projection of the pins has a portion extending rearwardly of the platen to thereby facilitate loading of the record material onto the feed apparatus. The pins in this rearward portion preferably only partly project from the respective openings in the pin wheel feeding device housing.

A still further feature of the preferred embodiment is the provision of a card guide on the carriage of the printer that has a length substantially coextensive with the length of the platen. In this manner, the record material is reliably guided past the print carriage and the upper bail bar rollers no matter what position such rollers are in. The longer card guide also contributes to a more uniform and controlled gap between the card guide and the platen in the front area of the platen, so as to reduce smearing in printing due to buckling of the paper and the like.

These and other aspects and advantages will be more completely described below with reference to the drawings.

DESCRIPTION OF THE PREFERRED EMBODIMENT

Figure 1:
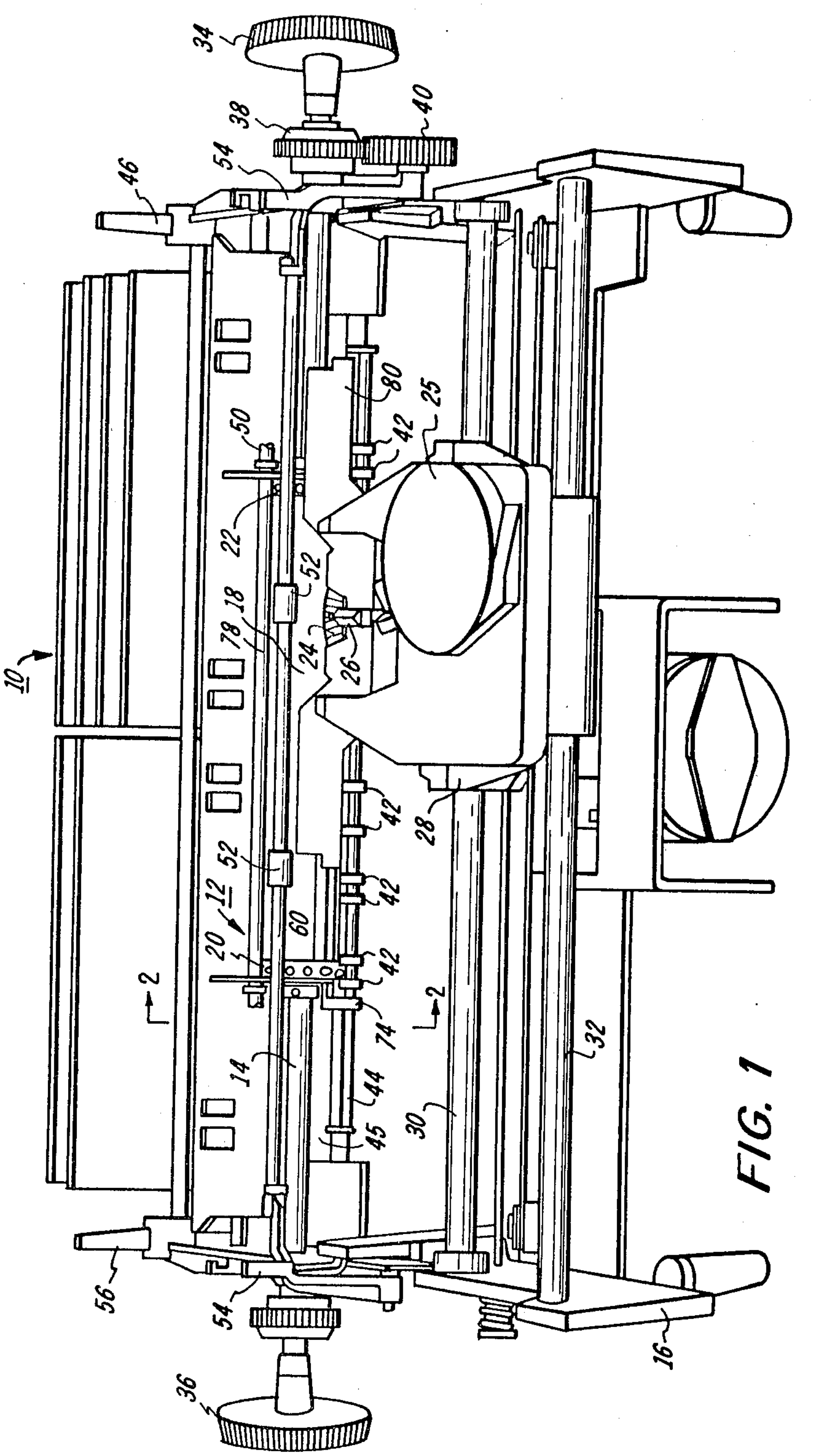
FIG. 1 is a front perspective view of a printing machine incorporating a bidirectional pin feed apparatus of the present invention therein.

Referring to FIG. 1, an exemplary printing machine (printer) 10 is shown incorporating a bi-directional pin feed apparatus 12 of the present invention. The pin feed apparatus 12 includes a shaft 14 mounted by suitable means (not shown) at either end to the main frame 16 of the printer 10 for rotation about its longitudinal axis. Mounted about the shaft 14 for rotation therewith is a platen 18 of predetermined length. A pair of pin wheel feeding devices 20 and 22 are also mounted about the shaft 14 in a manner to be described below. The pin wheel feeding devices are capable of feeding marginally punched record material (not shown) disposed about the platen 18 past a printing station. The printing station is defined in the printer 10 by the location of a print wheel 24, ribbon cartridge 25 and hammer assembly 26 that is mounted to a carriage 28. The carriage 28 is movable along a pair of rods 30 and 32 parallel to the shaft 14 in a known manner. Further details of the overall carriage assembly, including the print wheel 24, ribbon cartridge 25 and hammer assembly 26 may be obtained through a review of U.S. Pat. No. 4,091,911.

Before continuing with a description of the pin feed apparatus 12, it should be noted that a pair of knobs 34 and 36 are provided on the printer 10 for enabling the manual rotation of the shaft 14 and platen 18. As is conventional, the knob 36 is fixed relative to the shaft 14 and the knob 34 is movable axially of the shaft between first and second positions. Wherein a first position, a gear drive assembly 38 mounted about the shaft 14 adjacent the knob 34 is engaged with the shaft so that a motor gear arrangement 40 (only partly shown) coupled to the gear drive assembly 38 controls the automatic rotation of the shaft. When in a second position, the knob 34 disengages the gear drive assembly 38 from the shaft 14 so that manual rotation of the knobs 34 and 36 will cause a corresponding rotation of the shaft 14 and platen 18.

It must further be noted at this point that, although the platen 18 is shown of a particular length, any suitable length of platen can be employed consistent with the width of record material to be employed.

Figure 3:
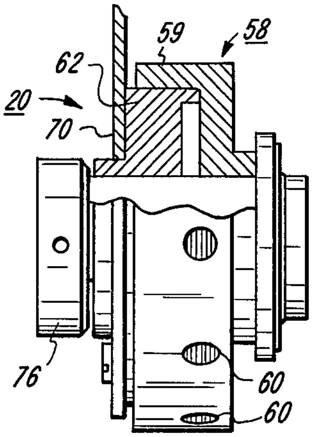
FIG. 3 is a side elevational view, partly broken away and in section, of the left pin wheel feeding device shown in FIG. 1.

The pin feed apparatus 12 further includes a plurality of preferably identical guide shoes 42 fastened onto and spaced as desired along a bail bar 44 that is preferably square-shaped in cross section. The specific nature and purpose of these guide shoes 42 and bail bar 44 form an important aspect of the invention and will be described in more detail below. At this point, however, it should be noted that the bail bar 44 is preferably rotatably mounted about its axis. In one embodiment, the bar 44 may be rotatably mounted at either end to a support and linkage means 45 (only partly shown) that is connected to a lever 46. In this arrangement, the lever 46 would be movable between first and second positions in order to cause the support and linkage means 45 to move the bail bar 44 between first and second positions relative to the platen 16. In a first position closely adjacent the platen 18, the guide shoes 42 form a gap 48 of predetermined dimensions through which record material of predetermined thickness is to be fed. When it is desired to initially load the record material onto the pin feed apparatus 12, the lever 46 may be moved to its second position (not shown) to move the bail bar 44 to its second position (not shown) further away from the platen then its first position (FIG. 3). In an alternative embodiment, the bar 44 may be rotatably mounted to the printer frame, but yet fixed in position relative to the platen in order to provide a gap sufficient to accommodate the thickest form desired to be used, e.g. 0.030–0.040 inch.

The pin feed apparatus 12 also includes an upper bail bar 50 having a plurality, e.g., two, follower rollers 52 rotatably mounted thereon. These rollers serve to hold the record material close to, but without touching the platen so that it is directed from the printer 10 in a generally rearward direction as is conventional. Conventional spring biased levers 54 are connected to the printer 10 and to the bail bar 50 for maintaining the rollers 52 in a desired position relative to the platen 16 when the levers 54 are in a first position, and for moving the bail bar 50 and thus rollers 52 a predetermined distance from the platen 16 when the levers 54 are moved to a second position in order to load a print wheel 24 and/or ribbon cartridge 25 onto the carriage 28.

The pin feed apparatus 12 also preferably includes a lever 56 connected to the printer 10 and capable of being manually positioned at a number of detent positions corresponding to desired distances of the platen 16, bail bar 44 and guide shoes 42 (together considered as an assembly) relative to the print member 24. Appropriate and conventional linkage and mounting means (not shown) coupled between the lever 40 and the platen 16 and support and linkage means 45 achieves this desired shifting.

Figure 2:
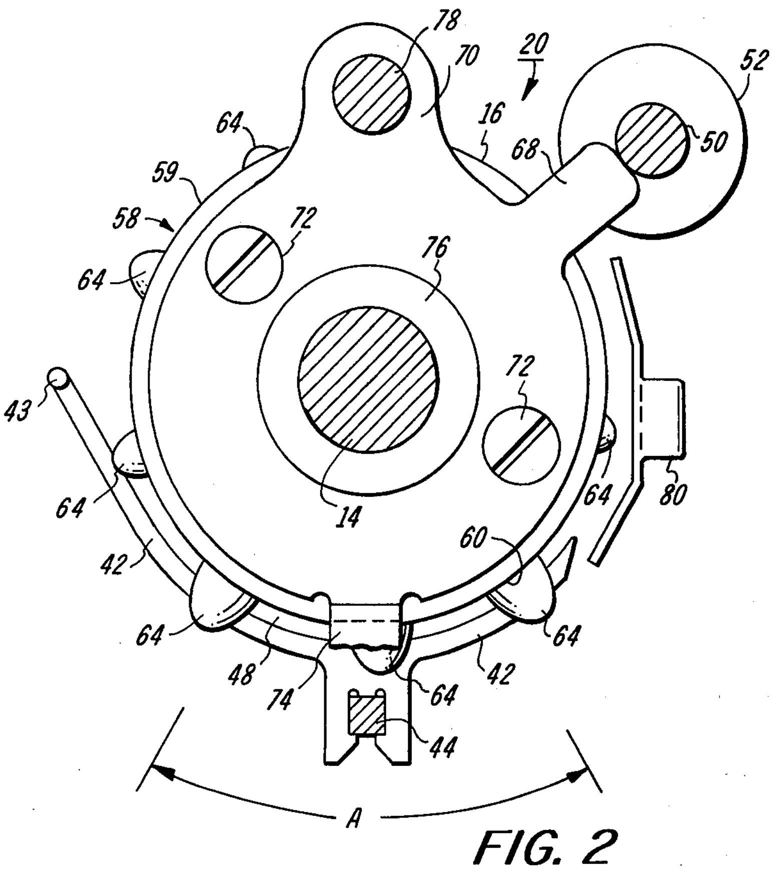
FIG. 2 is a partial cross sectional view of the printing machine of FIG. 1 taken along lines 2—2, wherein certain elements have been deleted for clarity of others (e.g., the left guide shoe of the pair shown in FIG. 1 lying on either side of the left pin wheel feeding device has been deleted)

Referring now to FIGS. 1–3 together, each pin wheel feeding device 20 and 22 includes a circularly cylindrical housing 58 having a peripheral wall 59 including a plurality of openings 60 formed therein. The housing 58 of pin wheel feeding device 20 is connected to the shaft 14 adjacent the left end of the platen 16 (preferably juxtaposed as shown in FIG. 1) and the housing 58 of pin wheel feeding device 22 is connected to the shaft adjacent the right end of the platen 16 (also juxtaposed as shown in FIG. 1). Each pin wheel feeding device further comprises a cam member 62 (FIG. 3) fixed in position relative to the housing 58 by means to be described below.

A plurality of pins 64 are disposed within each housing 58 in respective alignment with the plurality of openings 60 of the peripherial wall 59. The pins each reside in channels (not shown) formed in the housing 58 and have grooves engaged with the cam member 62 such that as the housing 58 is rotated by rotation of the shaft 14, the pins are made to follow the path defined by the fixed cam member 62. A preferred cam member 62 has a shape that will force the pins 64 to project through their respective openings 60 for a segment and in an amount shown in FIG. 2. Thus, and with respect to pin wheel feeding device 20 as shown in FIG. 2, the three lower most pins 64 would preferably fully project from their openings 60, whereas three pins located clockwise from the left-most lower pin 64 would preferably project only partially and one pin located counterclockwise from the right-most lower pin would preferably project only partially. The reverse orientation would be true with respect to pin wheel feeding device 22. The reason behind this preferred orientation will be discussed below.

Attached to the cam member 62 of each pin wheel feeding device 20 and 22 is a plate 70. Each plate may be attached by a pair of screws 72 or any other suitable fastening device. The main purpose of each plate 70 is to cooperate with means for maintaining the position of the cam member 62 fixed relative to the rotatable shaft 14. To this end, and as shown in FIGS. 1 and 2, a tab 74 projects from the outer surface of each plate 70 and has a slot at its end that engages the flange the square shaft 44 to restrain any possible rotation of the cam member 62 relative to the shaft 14. Each plate 70 also includes another tab 68 that serves as a stop for preventing the upper bail bar rollers 52 from contacting the platen 16. In this respect, the bail bar 50 would contact the tab 68 when the bail bar is located closely adjacent the platen 16 as shown in FIG. 2.

Also forming part of each pin wheel feeding device 20 and 22 and connected to the respective cam member 62 is a conventional bearing member 76 that is mounted about the shaft 14. Although the track of each cam member 62 that is followed by the pins 64 is different than the cam member disclosed in U.S. Pat. No. 4,033,493, that patent may still be reviewed for a more complete description of other aspects of the pin wheel feeding devices 20 and 22.

A rod 78 is preferably coupled between each plate 70 in a position such that it rests just above and slightly forwardly of the platen 14. The primary purpose of rod 78 is to prevent the record material from staying on those pins 64 located rearwardly of the platen 14 (FIG. 3) during reverse feeding.

As shown in FIG. 2 and as alluded to above, the pins 64 fully project from their respective holes 60 for a segment A of their circumferential movement during rotation of the housing 58, and at least partially project for a greater segment of such circumferential movement. Segment A is preferably located generally downwardly with the middle pin 64 of the three fully extended pins projecting straight down, i.e. at the "6 o'clock" position. This relationship enables proper reversibility with reduced slippage and buckling of the record material since such material would be positively driven in both directions from the lower-most curved area of the record material about the platen 18. The location of the three rearwardly partially projected pins 64 contributes to an easy load of record material onto the pin wheel feeding devices 20 and 22.

Figure 4:
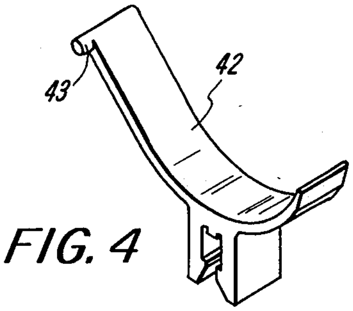
FIG. 4 is a perspective view of the guide shoe shown in FIG. 2.

In prior art bilateral pin feed apparatus, it would not be possible to have the pins fully project only underneath as shown in FIG. 2 without interfering with the conventional lower bail bar rollers and paper guide pan. In accordance with the present invention, however, the lower bail bar rollers and paper guide pan are replaced by the plurality of guide shoes 42 that are slidably mounted to the support bar 44. As alluded to above, the support bar 44 may be rotatably mounted to either the printer frame or the support and linkage assembly 45. In either event, the rotatability of the bar 44 enables the entire guide shoe-support bar assembly to be swivelable. The swivelable nature of the guide show-bar assembly enables the size of gap 48 to be self-adjusting front to back in order to allow creases of the form to pass through without interruption. A pair of shoes 42 are disposed adjacent each pin wheel feeding device 20 and 22 on either side of the path of circumferential movement of the pins 64 of such device, thereby avoiding interference therewith. The shoes preferably all have the shape shown in FIGS. 1, 2 and 4 to define a gap 48 of predetermined dimensions through which a record material of slightly lesser thickness will be fed by the devices 20 and 22. Each guide shoe 42 also preferably includes a pin 43 projecting from the rearward end thereof as shown in FIG. 4. The pins 43 enable a pair of adjacent guide shoes to be properly spaced from one another so as to be positionable on either side of the path of circumferential movement of the pins 64 of a pin feed device (20 or 22) without interfering with such movement. The pins 43 also serve to prevent paper from incorrectly entering the space between the pins.

As shown in FIGS. 1 and 2, the printer 10 preferably includes a card guide 80 having a length substantially coextensive with the length of the platen 18 and a contour as shown in FIGS. 1 and 2. It will be appreciated that the card guide 80 is significantly longer than conventional card guides in substantially matching the length of the platen 80. This extra long card guide facilitates the tearing of perforated record material, such as computer forms paper, just above the upper writing line of the record material remaining in the printer, i.e. just below the writing line of the record material torn away. The upper bail bar 50 (FIG. 1) need not be moved away and the record material need not be reloaded in order to achieve such tearing. In fact, nothing at all need be moved in order to easily tear away the upper portion of the perforated record material and print subsequently onto the record material remaining in the printer 10.

The card guide 80 also contributes to an easy loading of the record material about the platen 18, due to its extended length and general contour that substantially follows the arc of the platen from the upper forward position of the guide shoes 42 to the rollers 52 on the upper bail bar 50 (see FIG. 2). Thus, once the record material engages the rearward pins 64, nothing other than turning the platen 18 counterclockwise (FIG. 2) need be done in order to load the record material onto the pin wheel feeding devices 20 and 22 and about the platen 18.

Although the invention has been described with respect to a presently preferred embodiment, it will be appreciated by those skilled in the art that various modifications, substitutions, etc. may be made without departing from the spirit and scope of the invention as defined in and by the following claims.

What is claimed is:

1. In a printing device including a main frame and a printing station, a bi-directional pin feed apparatus for selectively feeding marginally punched record material in opposite directions past said printing station comprising:

a shaft reversibly rotatably mounted to said main frame;

a platen mounted about said shaft for rotation therewith;

a pin wheel feeding device for feeding marginally punched record material disposed about said platen in opposite directions past said printing station, said pin wheel feeding device including a housing coupled to said shaft adjacent an end of said platen for rotation therewith, said housing having a plurality of openings formed therein, said pin wheel feeding device further including a cam member fixed in position relative to said housing and a plurality of pins disposed within said housing in respective alignment with said plurality of openings, said pins cooperating with said cam member during rotation of said housing to project from their respective openings for a single predetermined segment of their path of circumferential movement, said predetermined segment being predominately vertically downward; and guide means connected to said main frame and including a pair of guide members positioned on either side of said single predetermined segment of the path of circumferential movement of said pins, said guide members being spaced from said housing to define a gap therebetween through which perforated record material is advanced during rotation of said shaft by the projecting pins.

2. The pin feed apparatus of claim 1, wherein said guide means further comprises:

a bar to which said pair of guide members are mounted; and means for mounting said bar to said main frame such that the longitudinal axis of said bar is parallel to that of said shaft.

3. The pin feed apparatus of claim 2, wherein said guide members are slidably mounted on said bar for movement along the longitudinal extent of said bar.

4. The pin feed apparatus of claim 3, wherein said bar is rotatably mounted about its axis whereby the assembly comprised of said guide members and said bar is swivelable.

5. The pin feed apparatus of claim 4, wherein there are a pair of pin wheel feeding devices having their housings respectively coupled to said shaft adjacent opposing ends of said platen.

6. The pin feed apparatus of claim 5, wherein there are at least two pairs of guide members mounted on said bar, each pair being associated with a particular one of said pin wheel feeding devices.

7. The pin feed apparatus of claim 6, wherein there are more than two pairs of guide members mounted on said bar.

8. The pin feed apparatus of claim 1, wherein the pair of guide members include means for maintaining such members spaced at least a predetermined distance apart.

9. The pin feed apparatus of claim 1 or claim 8, in combination with a card guide mounted to a carriage assembly of said printing device, said card guide being substantially coextensive in length with said platen.

* * * * *